United States Patent [19]

Barthélemy et al.

[11] Patent Number: 5,304,320
[45] Date of Patent: Apr. 19, 1994

[54] COMPOSITIONS COMPRISING A FLUORO ETHER AND USE OF THESE COMPOSITIONS

[75] Inventors: Pierre Barthélemy, Jodoigne; Mireille Paulus, Brussels, both of Belgium

[73] Assignee: Solvay (Société Anonyme), Brussels, Belgium

[21] Appl. No.: 929,952

[22] Filed: Aug. 17, 1992

[30] Foreign Application Priority Data

Aug. 19, 1991 [BE] Belgium ............................... 09100755

[51] Int. Cl.$^5$ .......................... C09K 5/04; C09K 3/18; C08J 9/14; C11D 7/50
[52] U.S. Cl. .......................................... 252/67; 62/114; 134/38; 134/40; 134/42; 252/162; 252/170; 252/171; 252/194; 252/364; 252/DIG. 9; 264/53; 264/DIG. 5; 521/98; 521/131
[58] Field of Search ................. 252/67, 162, 170, 171, 252/194, 364, DIG. 9; 134/38, 40, 42; 62/114; 264/53, DIG. 5; 521/98, 131

[56] References Cited

U.S. PATENT DOCUMENTS

| | | | |
|---|---|---|---|
| 3,409,555 | 11/1968 | Eiseman | 252/67 |
| 3,761,524 | 9/1973 | Terrell et al. | 568/683 |
| 3,846,332 | 11/1974 | Croix | 252/364 |
| 3,897,502 | 7/1975 | Russell et al. | 568/683 |
| 4,559,154 | 12/1985 | Powell | 252/67 |
| 4,948,526 | 8/1990 | Fellows et al. | 252/67 |
| 4,999,127 | 3/1991 | Merchant | 252/171 |
| 5,026,498 | 6/1991 | Merchant | 252/171 |
| 5,068,051 | 11/1991 | Kikuchi et al. | 252/162 |
| 5,087,383 | 2/1992 | Robeck et al. | 252/171 |
| 5,091,104 | 2/1992 | van Der Puy | 252/171 |
| 5,137,932 | 8/1992 | Behme et al. | 521/131 |
| 5,169,873 | 12/1992 | Behme et al. | 521/114 |
| 5,205,956 | 4/1993 | Volkert et al. | 521/131 |

FOREIGN PATENT DOCUMENTS

| | | |
|---|---|---|
| 0325265A1 | 7/1989 | European Pat. Off. . |
| 0389133A1 | 9/1990 | European Pat. Off. . |
| 0392668A1 | 10/1990 | European Pat. Off. . |
| 0416777A2 | 3/1991 | European Pat. Off. . |
| 450855 | 10/1991 | European Pat. Off. . |
| 510295 | 10/1992 | European Pat. Off. . |
| WO89/10984 | 11/1989 | PCT Int'l Appl. . |
| WO89/12118 | 12/1989 | PCT Int'l Appl. . |
| 93/11201 | 6/1993 | World Int. Prop. O. . |

OTHER PUBLICATIONS

*Encyclopedia of Polymer Science and Engineering*, vol. 3, "Cellular Materials to Composites", John Wiley & Sons, 1985, pp. 1-60.

*Primary Examiner*—Linda Skaling
*Attorney, Agent, or Firm*—Spencer, Frank & Schneider

[57] ABSTRACT

The invention relates to azeotropic and pseudoazeotropic compositions comprising difluoromethoxy-2,2,2-trifluoroethane with 2,2-dichloro-1,1,1-trifluoroethane or with 1,1-dichloro-1-fluoroethane. These compositions can be employed as solvents, especially for cleaning electronic components and for degreasing metals, as blowing agents, especially for the preparation of polyurethane foams, or as refrigerants.

11 Claims, No Drawings

COMPOSITIONS COMPRISING A FLUORO ETHER AND USE OF THESE COMPOSITIONS

The invention relates to azeotropic and pseudoazeotropic compositions comprising a fluoro ether and to the uses of these compositions, especially as a solvent, as a swelling agent or as a refrigerant fluid.

Fully halogenated chlorofluoro solvents (CFCs) such as 1,1,2-trichloro-1,2,2-trifluoroethane (CFC-113) are widely employed in industry for degreasing and cleaning various surfaces, especially in the case of delicate and complicated components and those difficult to clean. The solvents can be used in various ways, in most cases involving at least one stage in vapour phase.

CFC-113 is often employed for cleaning printed circuit boards and for cleaning or degreasing precision components, especially in optics, mechanics or electronics. CFC-113 is employed either pure or mixed with other compounds, especially alkanes, alcohols or esters which increase the solvent power of the product. The use of mixtures of azeotropic type is then advantageous, since the composition of the bath does not vary with time or during the various stages of the cleaning process.

Various compositions based on CFC-113 are also traditionally employed as a drying agent, in order to remove the water adsorbed at the surface of delicate components.

In processes for the preparation of cellular polymeric materials, such as polyurethane foams, trichlorofluoromethane (CFC-11), dichlorodifluoromethane (CFC-12) and, to a lesser extent, chlorodifluoromethane (HCFC-22), trichlorotrifluoroethane (CFC-113) and dichlorotetrafluoroethane (CFC-114) have for a long time been employed as a blowing agent. Because of its very low thermal conductivity, CFC-11 makes it possible to obtain rigid polyurethane foams which are particularly insulating and which are extensively employed as thermal insulators, especially in the fields of construction, refrigeration and transport. The use of chlorofluoroalkanes as a swelling agent in the processes for the preparation of these cellular materials is well known.

CFC-11 and other fully halogenated chlorofluoroalkanes are also traditionally employed as refrigerant fluids in some refrigeration compressors.

However, fully halogenated chlorofluoroalkanes (CFCs) which are conventionally employed as cleaning agents, as swelling agents or as refrigerants are today suspected of causing environmental problems associated with the destruction of the stratospheric ozone layer. The effect which a product can have on the ozone layer has been quantified, starting with complex mathematical models, as its ozone destruction potential (ODP) and is expressed in relation to the ODP of CFC-11. A worldwide agreement, "The Montreal Protocol", signed in September, 1987, called for a reduction in the usage and production of CFCs with, in the long term, a ban on their use. Consequently, there is at present an urgent need to find new cleaning agents, new blowing agents and new refrigerants which have little or no effect on the ozone layer.

To this end, a number of azeotropic compositions based on some chlorofluorocarbons which are not fully halogenated, known by the generic term of hydrochlorofluorocarbons (HCFCs) or hydrofluoroalkanes (HFAs), such as 1,1-dichloro-1-fluoroethane (HCFC-141b) or 2,2-dichloro-1,1,1-trifluoroethane (HCFC-123) mixed with each other or especially with methanol or ethanol, have been proposed (EP-A-325,265, EP-A-389,133, EP-A-392,668, W089/10,984, W089/12,118). The ODP of HCFC-141b is equal to approximately 0.1 and that of HCFC-123 is of the order of 0.02. Thus, these products already represent a very considerable step forward in relation to traditional CFCs. Patent Application EP-A-416,777 describes a process for the preparation of polymer foams with a fluoro ether as blowing agent. This application does not, however, disclose any azeotropic compositions.

One of the objectives of the present invention is to provide new azeotropic or pseudoazeotropic compositions exhibiting a very low ODP and capable of being employed especially as a cleaning agent, a blowing agent for cellular polymeric materials or else as a refrigerant fluid, replacing fully halogenated chlorofluoroalkanes suspected of attacking the stratospheric ozone layer.

The present invention relates to azeotropic or pseudoazeotropic compositions comprising difluoromethoxy-2,2,2-trifluoroethane and at least one compound chosen from 2,2-dichloro-1,1,1-trifluoroethane (HCFC-123) and 1,1-dichloro-1-fluoroethane(HCFC-141b). Difluoromethoxy-2,2,2-trifluoroethane appears particularly advantageous in respect of its impact on the environment, since it exhibits a zero ODP because of the absence of chlorine in its molecular structure. The presence of difluoromethoxy-2,2,2-trifluoroethane in the compositions according to the invention therefore makes it possible to reduce their ODP accordingly.

An azeotropic or pseudoazeotropic composition is intended to mean any mixture of two or more substances of a virtually constant boiling point, which behaves like a pure substance, that is to say in which the composition of the vapour produced by evaporation or by distillation is substantially identical to the composition of the liquid mixture. In practice these azeotropes or pseudoazeotropes with a virtually constant boiling point, either or minimum or maximum, cannot therefore be separated by simple distillation or by preferential evaporation.

The thermodynamic state of a fluid is fundamentally defined by four interdependant variables: the pressure (P), the temperature (T), the composition of the liquid phase (X) and the composition of the gaseous phase (Y). An azeotrope or a pseudoazeotrope is a particular system containing 2 or more components, in the case of which, at a given temperature and at a given pressure, X is substantially equal to Y. The compositions according to the invention are characterised by their composition observed at atmospheric pressure. It goes without saying that this does not limit the compositions according to the invention to these particular compositions; all compositions comprising difluoromethoxy-2,2,2-trifluoroethane and at least one compound chosen from 2,2-dichloro-1,1,1-trifluoroethane and 1,1-dichloro-1-fluoroethane exhibiting an azeotropic or pseudoazeotropic character as defined above are covered by the invention, whatever the pressure at which these compositions are used. It is, in fact, well known for the composition and the boiling point of an azeotrope containing 2 or more constituents to vary as a function of the chosen pressure conditions.

It has been found that liquid mixtures of difluoromethoxy-2,2,2-trifluoroethane and of HCFC-123 and liquid mixtures of difluoromethoxy-2,2,2-trifluoroethane and of HCFC-141b produce, by evaporation, a vapour whose composition is substantially identical with that of the liquid mixture. Consequently, the evaporation of these mixtures, be it natural or forced by boiling or by pressure release, does not produce any significant separation of the compositions into their components. Furthermore, it has been observed that these mixtures boil at a temperature which is lower than the boiling points of their components. Mixtures of difluoromethoxy-2,2,2-trifluoroethane (boiling point at atmospheric pressure of approximately 29.8° C.) and of 2,2-dichloro-1,1,1-trifluoroethane (boiling point at atmospheric pressure of approximately 27.8° C.) boil at atmospheric pressure at a temperature of approximately 27.0°±1° C. Mixtures of difluoromethoxy-2,2,2-trifluoroethane and of 1,1-dichloro-1-fluoroethane (boiling point at atmospheric pressure of approximately 31.7° C.) boil at atmospheric pressure at a temperature of approximately 28.5°±1° C.

The binary mixtures consisting of approximately 5 to 95% by weight of difluoromethoxy-2,2,2-trifluoroethane and of approximately 95 to 5% by weight of 2,2-dichloro-1,1,1-trifluoroethane form azeotropes or pseudoazeotropes according to the invention. The azeotropes or pseudoazeotropes formed by the binary mixtures consisting of approximately 20 to 80% by weight of difluoromethoxy-2,2,2-trifluoroethane and of approximately 80 to 20% by weight of 2,2-dichloro-1,1,1-trifluoroethane are preferred. The azeotropes or pseudoazeotropes formed by binary mixtures consisting of approximately 30 to 65% by weight of difluoromethoxy-2,2,2-trifluoroethane and of approximately 70 to 35% by weight of 2,2-dichloro-1,1,1-trifluoroethane are particularly preferred. At atmospheric pressure the binary composition consisting of approximately 45% by weight of difluoromethoxy-2,2,2-trifluoroethane and of approximately 55% by weight of 2,2-dichloro-1,1,1-trifluoroethane forms a true azeotrope whose boiling point is approximately 26.0° C. This composition is very particularly preferred.

Binary mixtures consisting of approximately 5 to 95% by weight of difluoromethoxy-2,2,2-trifluoroethane and approximately 95 to 5% by weight of 1,1-dichloro-1-fluoroethane form azeotropes or pseudoazeotropes according to the invention. The azeotropes or pseudoazeotropes formed by the binary mixtures consisting of approximately 30 to 85% by weight of difluoromethoxy-2,2,2-trifluoroethane and approximately 70 to 15% by weight of 1,1-dichloro-1-fluoroethane are preferred. Azeotropes or pseudoazeotropes formed by binary mixtures consisting of approximately 45 to 75% by weight of difluoromethoxy-2,2,2-trifluoroethane and approximately 55 to 25% by weight of 1,1-dichloro-1-fluoroethane are particularly preferred. At atmospheric pressure the binary composition consisting of approximately 61% by weight of difluoromethoxy-2,2,2-trifluoroethane and approximately 39% by weight of 1,1-dichloro-1-fluoroethane forms a true azeotrope whose boiling point is approximately 27.5° C. This composition is very particularly preferred.

Small quantities of other additives may also be added to the compositions according to the invention. Thus, the latter may have added to them stabilisers, surface-active agents or any other additives which make it possible to improve their performance in use. The possible other additives are added in a proportion of approximately 0.001 to 5% by weight of the azeotropic or pseudoazeotropic mixture.

The invention also relates to the use of the azeotropic or pseudoazeotropic compositions according to the invention, comprising difluoromethoxy-2,2,2-trifluoroethane and at least the compound chosen from 2,2-dichloro-1,1,1-trifluoroethane (HCFC-123) and 1,1-dichloro-1-fluoroethane (HCFC-141b) as cleaning agent, in particular as solvent, as degreasing agent, as defluxing agent or as drying agent. The invention also relates to the use of the azeotropic or pseudoazeotropic compositions according to the invention as a blowing agent for the preparation of cellular polymeric materials, as a refrigerant fluid or as a propellent gas for packaging under pressure.

As a result of their azeotropic or pseudoazeotropic nature, the compositions according to the invention can be used in any application without any separation of these compositions into their constituents taking place by evaporation or by distillation. The azeotropic character of these compositions is particularly advantageous when they are employed in cleaning processes using a solvent. These compositions exhibit very good compatibility with the various types of surfaces to be treated, be they made of metal, plastic or glass.

The compositions according to the invention are suitable for any cold cleaning operation or for cleaning surfaces with vapour.

The compositions according to the invention also appear particularly effective in processes for cleaning printed circuit boards, which processes are intended to remove from the surface of these boards the pickling flux employed in the stage of soldering of electronic components and its residues. Traditional brazing fluxes consist of rosin, employed by itself or with certain activators. The fluxes and their residues are removed from the surface of the printed circuit board in a particularly effective and selective manner with the compositions according to the invention, even when these fluxes are highly activated. The azeotropic or pseudoazeotropic compositions according to the invention have, in fact, a high solvent power for flux and its residues without, however, damaging the material forming the board substrate or the electronic components arranged thereon. In addition, the compositions according to the invention offer certain characteristics, especially of viscosity and surface tension, which are particularly well suited to this application.

The compositions according to the invention can also be employed in any other process as a replacement for compositions based on CFC-113. They are particularly well suited as a drying agent, that is to say for removing the water adsorbed at the surface of solid objects which require a particularly clean surface, such as printed circuits, silicon wafers, optical glasses, clock components and any other precision components.

The compositions according to the invention can also be employed as a blowing agent in any process for the preparation of a cellular polymeric material by polymerisation, polycondensation or polyaddition of the reactants in the presence of a blowing agent or by blowing a prepolymerised thermoplastic material with the aid of a blowing agent. It has been found that the compositions according to the invention are excellent blowing agents for the production of cellular polymeric materials, in particular for those based on polyurethane. The quantity of foams produced when employing these blowing agents is substantially identical to that of the products obtained conventionally, for example with the aid of CFC-11. The compositions according to the invention are particularly well suited for the production of flexible, semi-rigid or rigid foams based on polyisocyanates, such as polyurethane foams and polyisocyanurate foams. They can also be employed for the preparation of other cellular polymeric materials based, for example, on polyolefins, polyvinyl chloride, polystyrene or phenolic resins. Various well-known application techniques allowing these cellular materials to be manufactured are described, for example, in the "Encyclopedia of Polymer Science and Engineering", Vol. 3, 1985, pages 1 to 60.

As a result of their azeotropic or pseudoazeotropic nature, the compositions according to the invention can also be employed as refrigerant fluids in some refrigeration compressors, such as the centrifugal "chillers".

The examples below, which do not imply any limitation, illustrate the invention in a more detailed manner.

EXAMPLE 1

A glass distillation apparatus consisting of a boiler flask supporting a reflux condenser was employed to demonstrate the existence of azeotropic or pseudoazeotropic compositions between difluoromethoxy-2,2,2-trifluoroethane and 1,1-dichloro-1-fluoroethane. The temperature of the liquid is measured with the aid of a thermometer immersed in the flask.

25 ml of pure difluoromethoxy-2,2,2-trifluoroethane are heated to boiling at atmospheric pressure and small quantities of 1,1-dichloro-1-fluoroethane are then gradually introduced into the flask with a graduated syringe via a side tube fitted with a septum.

The determination of the azeotropic composition is performed by recording the change in the boiling temperature of the mixture as a function of its composition. The composition in the case of which a minimum or maximum boiling point is observed is the azeotropic composition at atmospheric pressure.

The influence of atmospheric pressure on the boiling temperature of the mixtures is corrected with the aid of the following formula:

$$tc = tr + 0.00012 (760-P) (273+tr)$$

with
tr, the recorded temperature in °C.
tc, the corrected temperature in °C.
P, the atmospheric pressure at the time of measurement, in mm Hg.

The corrected boiling temperatures obtained for various compositions of difluoromethoxy-2,2,2-trifluoroethane and of 1,1-dichloro-1-fluoroethane are collated in Table I.

The best estimate of the composition in the case of which the boiling point is lowest is approximately 61% by weight of difluoromethoxy-2,2,2-trifluoroethane. The boiling point is 27.7° C.±0.2° C. in the case of compositions containing approximately 43 to 80% by weight of difluoromethoxy-2,2,2-trifluoroethane.

TABLE I

| Weight fraction of $CF_3-CH_2-O-CHF_2$ in the mixture | Boiling temperature (°C.) |
|---|---|
| 100 | 29.8 |
| 98.21 | 29.6 |
| 94.80 | 29.2 |
| 90.12 | 28.9 |
| 84.55 | 28.2 |
| 79.63 | 27.9 |

TABLE I-continued

| Weight fraction of $CF_3-CH_2-O-CHF_2$ in the mixture | Boiling temperature (°C.) |
|---|---|
| 75.25 | 27.8 |
| 71.35 | 27.5 |
| 67.79 | 27.6 |
| 63.11 | 27.6 |
| 59.02 | 27.5 |
| 55.43 | 27.5 |
| 51.28 | 27.5 |
| 47.70 | 27.6 |
| 44.41 | 27.7 |
| 42.88 | 27.9 |
| 40.07 | 28.1 |

EXAMPLE 2

This example illustrates the azeotrope based on difluoromethoxy-2,2,2-trifluoroethane and 2,2-dichloro-1,1,1-trifluoroethane, demonstrated with the aid of the procedure described in Example 1, but this time progressively adding small quantities of difluoromethoxy-2,2,2-trifluoroethane to 40 ml of 2,2-dichloro-1,1,1-trifluoroethane. The corrected boiling points for various compositions by weight of difluoromethoxy-2,2,2-trifluoroethane and of 2,2-dichloro-1,1,1-trifluoroethane are collated in Table II.

The best estimate of the composition in the case of which the boiling point is lowest is approximately 45% by weight of difluoromethoxy-2,2,2-trifluoroethane. The boiling point is 26.2° C.±0.2° C. for compositions containing approximately 25 to 65% by weight of difluoromethoxy-2,2,2-trifluoroethane.

TABLE II

| Weight fraction of $CF_3-CH_2-O-CHF_2$ in the mixture | Boiling temperature (°C.) |
|---|---|
| 0 | 27.8 |
| 4.51 | 27.4 |
| 8.64 | 27.3 |
| 12.42 | 27.2 |
| 15.91 | 27.0 |
| 17.55 | 26.8 |
| 19.12 | 26.6 |
| 22.10 | 26.6 |
| 23.51 | 26.5 |
| 24.87 | 26.4 |
| 26.17 | 26.3 |
| 29.85 | 26.2 |
| 32.35 | 26.2 |
| 34.68 | 26.2 |
| 36.86 | 26.1 |
| 38.06 | 26.0 |
| 39.22 | 26.1 |
| 41.40 | 26.1 |
| 44.38 | 26.0 |
| 48.36 | 26.1 |
| 50.33 | 26.2 |
| 55.43 | 26.2 |
| 58.21 | 26.3 |
| 62.13 | 26.4 |
| 64.16 | 26.4 |

EXAMPLES 3 TO 8

Various rigid polyurethane foams were prepared with various blowing agents, starting with the same single formulation containing a polymeric diphenylmethane isocyanate (MDI) and a mixture of an animated sucrose-based polyol, of a brominated polyol polyether IXOL B 251 and of a hydroxylated crosslinking agent. The diphenylmethane diisocyanate and the polyols are introduced in ratios such that the value 110 is reached. The formulation additionally contains a small quantity of silicone surfactant, of phosphorus-containing flame-retardant additive and of amine catalyst.

The blowing agents employed are the following: Example 1: 40% by weight of difluoromethoxy-2,2,2-trifluoroethane 60% by weight of 1,1-dichloro-1-fluoroethane Example 2: 40% by weight of difluoromethoxy-2,2,2-trifluoroethane 60% by weight of 2,2-dichloro-1,1,1-trifluoroethane Example 3C: 100% by weight of 1,1-dichloro-1-fluoroethane (HCFC-141b) Example 4C: 100% by weight of 2,2-dichloro-1,1,1-trifluoroethane (HCFC-123) Example 5C: 100% by weight of trichlorofluoro-methane (CFC-11)

The foams are prepared by thorough mixing of all the ingredients for 15 seconds by means of a multiblade-type stirrer rotating at a speed of 1600 revolutions per minute, followed by pouring the mixture into a closed 20×20×10 cm mould.

The formulations used and the properties of the various foams obtained are collated in Table III.

TABLE III

|  | EXAMPLE No. | | | | |
| --- | --- | --- | --- | --- | --- |
|  | 1 | 2 | 3(C) | 4(C) | 5(C) |
| FORMULATION (parts by weight) | | | | | |
| MDI, value 110 | | | | | |
| Polyols | 90 | 90 | 90 | 90 | 90 |
| Crosslinking agent | 7 | 7 | 7 | 7 | 7 |
| Flame-retardant agent | 5 | 5 | 5 | 5 | 5 |
| Silicone surfactant | 1 | 1 | 1 | 1 | 1 |
| Water | 1.15 | 1.15 | 1.15 | 1.15 | 1.15 |
| Amine catalyst | 1.4 | 1.4 | 1.4 | 1.4 | 1.4 |
| $CF_3-CH_2-O-CHF_2$ | 14 | 15.6 | — | — | — |
| $CFCl_2-CH_3$ (HCFC-141b) | 21 | — | 32 | — | — |
| $CF_3-CHCl_2$ (HCFC-123) | — | 23.4 | — | 38 | — |
| $CFCl_3$ (CFC-11) | — | — | — | — | 36 |
| FOAM CHARACTERISTICS | | | | | |
| Density, kg/m$^3$ | | | | | |
| raw, in closed mould | 40.7 | 40.4 | 41 | 40.6 | 40 |
| net, in closed mould | 33.6 | 33.5 | 33.7 | 33.6 | 33.4 |
| Thermal conductivity | | | | | |
| after 1 day, W/m K | 0.021 | 0.021 | 0.020 | 0.020 | 0.019 |
| after 2 weeks, W/m K | 0.022 | 0.023 | 0.023 | 0.022 | 0.021 |
| Cell structure | fine | fine | fine | fine | fine | fluoroethane, said composition having a boiling point at atmospheric pressure of approximately 26.2°±0.2° C.

3. A composition according to claim 1, consisting essentially of approximately 43 to 80% by weight of difluoromethoxy-2,2,2-trifluoroethane and of approximately 57 to 20% by weight of 1,1-dichloro-1-fluoroethane, said composition having a boiling point at atmospheric pressure of approximately 27.7°±0.2° C.

4. A composition according to claim 2 consisting essentially of approximately 45% by weight of difluoromethoxy-2,2,2-trifluoroethane and of approximately 55% by weight of 2,2-dichloro-1,1,1-trifluoroethane, forming an azeotrope whose boiling point is approximately 26.0° C. at atmospheric pressure.

5. A composition according to claim 3 consisting essentially of approximately 61% by weight of difluoromethoxy-2,2,2-trifluoroethane and of approximately 39% by weight of 1,1-dichloro-1-fluoroethane, forming an azetrope whose boiling point is approximately 27.5° C. at atmospheric pressure.

6. A blowing agent for cellular polymeric materials consisting essentially of a composition according to claim 1.

We claim:

1. A virtually constant boiling point composition consisting essentially of a binary mixture of approximately 5 to 95% by weight of difluoromethoxy-2,2,2-trifluoroethane and of 95 to 5% by weight of one compound selected from the group consisting of 2,2-dichloro-1,1,1-trifluoroethane and 1,1-dichloro-1-fluoroethane, said composition having a boiling point at atmospheric pressure of approximately 26.7°±0.7° C. when the compound is 2,2-dichloro-1,1,1-trifluoroethane and of 28.5°±1° C. when the compound is 1,1-dichloro-1-fluoroethane.

2. A composition according to claim 1, consisting essentially of approximately 25 to 65% by weight of difluoromethoxy-2,2,2-trifluoroethane and of approximately 75 to 35% by weight of 2,2-dichloro-1,1,1-tri- 7. A blowing agent for polyurethane foams, said blowing agent consisting essentially of a composition according to claim 1.

8. A refrigerant consisting essentially of a composition according to claim 1.

9. A cleaning agent for solid surfaces, said cleaning agent consisting essentially of a composition according to claim 1.

10. A defluxing agent for printed circuit boards, said defluxing agent consisting essentially of a composition according to claim 1.

11. A drying agent for removing the water adsorbed at the surface of solid objects, said drying agent consisting essentially of a composition according to claim 1.

* * * * *